(12) United States Patent
Kobayashi et al.

(10) Patent No.: US 8,153,251 B2
(45) Date of Patent: *Apr. 10, 2012

(54) PRESSURE-SENSITIVE ADHESIVE COMPOSITION AND PRESSURE-SENSITIVE ADHESIVE SHEETS

(75) Inventors: Natsuki Kobayashi, Ibaraki (JP); Tatsumi Amano, Ibaraki (JP); Masahiko Ando, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 587 days.

This patent is subject to a terminal disclaimer.

(21) Appl. No.: 11/117,114

(22) Filed: Apr. 28, 2005

(65) Prior Publication Data

US 2005/0244633 A1    Nov. 3, 2005

(30) Foreign Application Priority Data

Apr. 30, 2004  (JP) ................................. 2004-135167

(51) Int. Cl.
*B32B 7/12* (2006.01)
(52) U.S. Cl. .................. 428/356; 428/355 AC; 526/931
(58) Field of Classification Search .................. 526/931; 428/423.1, 355 R, 355 EN, 355 AC, 356; 523/111; 156/332
See application file for complete search history.

(56) References Cited

U.S. PATENT DOCUMENTS

| | | | | |
|---|---|---|---|---|
| 4,312,916 | A | * | 1/1982 | Kakumaru et al. ........... 428/345 |
| 4,668,730 | A | * | 5/1987 | Iovine et al. .................. 524/460 |
| 5,147,925 | A | | 9/1992 | Pears et al. |
| 5,326,966 | A | | 7/1994 | Fukuda et al. |
| 5,378,405 | A | | 1/1995 | Gutman et al. |
| 5,433,892 | A | | 7/1995 | Czech |
| 5,508,107 | A | * | 4/1996 | Gutman et al. ............... 428/339 |
| 5,574,117 | A | * | 11/1996 | Yoshida et al. ............... 526/224 |
| 5,591,820 | A | | 1/1997 | Kydonieus et al. |
| 5,631,079 | A | | 5/1997 | Gutman et al. |
| 5,635,564 | A | | 6/1997 | Wieditz et al. |
| 5,885,708 | A | * | 3/1999 | Lu et al. ....................... 428/353 |
| 5,952,398 | A | | 9/1999 | Dietz et al. |
| 5,985,990 | A | | 11/1999 | Kantner et al. |
| 6,548,605 | B1 | | 4/2003 | Morita et al. |
| 6,562,428 | B1 | | 5/2003 | Ohrui et al. |
| 6,783,850 | B2 | | 8/2004 | Takizawa et al. |
| 7,026,035 | B2 | | 4/2006 | Yano et al. |
| 7,491,758 | B2 | | 2/2009 | Amano et al. |
| 2002/0183442 | A1 | | 12/2002 | Wamprecht et al. |
| 2003/0091818 | A1 | | 5/2003 | Bamba et al. |
| 2004/0151903 | A1 | | 8/2004 | Niino et al. |
| 2004/0189907 | A1 | | 9/2004 | Tominaga et al. |
| 2005/0256251 | A1 | | 11/2005 | Amano et al. |
| 2005/0266238 | A1 | | 12/2005 | Amano et al. |
| 2006/0045990 | A1 | | 3/2006 | Kim et al. |
| 2006/0057368 | A1 | | 3/2006 | Kobayashi et al. |
| 2006/0057371 | A1 | | 3/2006 | Kobayashi et al. |
| 2008/0311395 | A1 | | 12/2008 | Ukei et al. |

FOREIGN PATENT DOCUMENTS

| | | |
|---|---|---|
| CN | 1517418 | 8/2004 |
| EP | 0435 080 A1 | 7/1991 |
| EP | 0 961 792 | 6/2002 |
| EP | 1 591 506 | 11/2005 |
| EP | 1 595 929 | 11/2005 |
| EP | 1 602 698 | 12/2005 |
| JP | 58-7470 | 1/1983 |
| JP | 2-080030 | 3/1990 |
| JP | 3-122165 | 5/1991 |
| JP | 5-9449 | 1/1993 |
| JP | 6-65551 | 3/1994 |
| JP | 6-100655 | 4/1994 |
| JP | 6-128539 | 5/1994 |
| JP | 6-128539 A | 5/1994 |
| JP | 7-104125 | 4/1995 |
| JP | 7-157741 | 6/1995 |
| JP | 7-310066 | 11/1995 |
| JP | 8-104857 | 4/1996 |
| JP | 8-155040 | 6/1996 |
| JP | 8-155040 A | 6/1996 |
| JP | 9-59581 | 3/1997 |
| JP | 9-87354 | 3/1997 |
| JP | 9-165460 | 6/1997 |
| JP | 11-256116 | 9/1999 |
| JP | 2980874 | 9/1999 |
| JP | 2000-44912 | 2/2000 |
| JP | 2000-129235 | 5/2000 |
| JP | 2000-273417 | 10/2000 |

(Continued)

OTHER PUBLICATIONS

U.S. Appl. No. 11/128,489, filed May 13, 2005, Tatsumi Amano, et al.
Database WPI, Section Ch, Week 199423, Derwent Publications Ltd., London, GB: AN 1994-189173, XP002343566.
European Search Report issued on the corresponding/ related EP Application No. 05010330, dated Sep. 19, 2005.
File History of the related U.S. Appl. No. 11/128,489 as of Apr. 23, 2008.
File History of the related U.S. Appl. No. 12/065,653, for the period of Mar. 15, 2008-Apr. 23, 2008.
European Search Report issued on the corresponding EP Application No. 05009331, dated Jul. 22, 2005.
Information Offer Form submitted in the corresponding Japanese Patent Application No. 2004-135167, dated Oct. 30, 2007.

(Continued)

*Primary Examiner* — Thao T. Tran
(74) *Attorney, Agent, or Firm* — Knobbe Martens Olson & Bear LLP

(57) ABSTRACT

An object of the present invention is to provide an electrostatic pressure-sensitive adhesive composition which is excellent in antistatic property of pressure-sensitive adhesive sheets upon peeling, and has reduced stainability in an adherend (subject to be protected) and is excellent in adhesion reliance, and electrification preventing pressure-sensitive adhesive sheets and a surface protecting film using the same. There is provided a pressure-sensitive adhesive composition, which comprises a (meth)acryl-based polymer containing, as a monomer component, 15 to 100% by weight of a (meth) acrylic acid alkylene oxide adduct, 0 to 85% by weight of a (meth)acryl-based monomer having an alkyl group of a carbon number of 1 to 14 other than the adduct, and 0 to 85% by weight of other polymerizable monomer, and an alkali metal salt.

15 Claims, 1 Drawing Sheet

FOREIGN PATENT DOCUMENTS

| | | |
|---|---|---|
| JP | 2001-49205 | 2/2001 |
| JP | 2001-146581 | 5/2001 |
| JP | 2001-220474 | 8/2001 |
| JP | 2001-512508 | 8/2001 |
| JP | 2001-305346 | 10/2001 |
| JP | 2001-316643 | 11/2001 |
| JP | 2002-019039 | 1/2002 |
| JP | 2002-293870 | 10/2002 |
| JP | 2003-41205 | 2/2003 |
| JP | 2003-147325 | 5/2003 |
| JP | 2004-287199 | 10/2004 |
| JP | 2005-200607 | 7/2005 |
| JP | 2005-206776 | 8/2005 |
| JP | 2007-536427 | 12/2007 |
| WO | WO 98/36005 | 8/1998 |
| WO | WO 00/24839 | 5/2000 |
| WO | WO 03/011958 | 2/2003 |

OTHER PUBLICATIONS

International Search Report issued on the related PCT Application No. PCT/JP2006/317458, dated Nov. 28, 2006.
Notice of Information Offer Form issued on the corresponding Japanese Patent Application No. 2004-135167, dated Dec. 11, 2007.
File History of the related U.S. Appl. No. 12/065,653, as of Mar. 14, 2008.
European Search Report issued on the related European Patent Application No. 05020138, dated Nov. 28, 2005.
European Search Report issued on the related European Patent Application No. 05020102, dated Nov. 29, 2005.
Information Offer Form submitted in the related Japanese Patent Application No. 2005-076890, dated Dec. 17, 2007.
Notice of Information Offer Form submitted on Jun. 16, 2008 issued on the corresponding Japanese Patent Application No. 2004-135167, dated Jul. 22, 2008.
Notice of Information Offer Form issued on the related Japanese Patent Application No. 2005-076890, dated Jan. 24, 2008.
File History of the related U.S. Appl. No. 11/128,489, for the period of Apr. 24, 2008-Sep. 15, 2008.
File History of the related U.S. Appl. No. 11/226,956, as of Sep. 15, 2008.
File History of the related U.S. Appl. No. 11/227,829, as of Sep. 15, 2008.
File History of the related U.S. Appl. No. 12/065,653, for the period of Apr. 30, 2008-Sep. 15, 2008.
File History of the related U.S. Appl. No. 11/141,590, as of Sep. 15, 2008.
File History of the related U.S. Appl. No. 11/128,489, for the period of Sep. 16, 2008-Feb. 3, 2009.
File History of the related U.S. Appl. No. 11/226,956, for the period of Sep. 16, 2008-Feb. 3, 2009.
File History of the related U.S. Appl. No. 11/227,829, for the period of Sep. 16, 2008-Feb. 3, 2009.
File History of the related U.S. Appl. No. 12/065,653, for the period of Sep. 16, 2008-Feb. 3, 2009.
File History of the related U.S. Appl. No. 11/141,590, for the period of Sep. 16, 2008-Feb. 3, 2009.
Chinese Office Action issued on the corresponding Chinese Patent Application No. 200510067077.1, dated Jun. 5, 2009.
Fujimoto, T., *Shin Kaimenkasseizai Nyuumon*, 1996, p. 277.
File History of the related U.S. Appl. No. 11/128,489, for the period of Feb. 4, 2009-Sep. 10, 2009.
File History of the related U.S. Appl. No. 11/226,956, for the period of Feb. 4, 2009-Sep. 10, 2009.
File History of the related U.S. Appl. No. 11/227,829, for the period of Feb. 4, 2009-Sep. 10, 2009.
File History of the related U.S. Appl. No. 12/065,653, for the period of Feb. 4, 2009-Sep. 10, 2009.
Shin-Nakamura Chemical Co., Ltd, "Product Name: NK ESTER AM-90G", Jun. 2001, (Searching Date: May 28, 2008), URL:http://www.shin-nakamura.com/monoma/AM-90G.htm.
"Adhesive Hand Book, the first edition", edited by Japan Adhesive Tape Manufactures Association, Adhesive Hand Book Editorial Committee, Mar. 2, 1985, the front page, the contents page, p. 79 and the colophon.
Information Offer Form submitted in the corresponding Japanese Patent Application No. 2004-135167, dated Jan. 27, 2010.
File History of the related U.S. Appl. No. 11/128,489, for the period of Jan. 20, 2010-Mar. 30, 2010.
File History of the related U.S. Appl. No. 11/226,956, for the period of Jan. 20, 2010-Mar. 30, 2010.
File History of the related U.S. Appl. No. 11/227,829, for the period of Jan. 20, 2010-Mar. 30, 2010.
File History of the related U.S. Appl. No. 11/128,489, for the period of Sep. 11, 2009-Jan. 19, 2010.
File History of the related U.S. Appl. No. 11/226,956, for the period of Sep. 11, 2009-Jan. 19, 2010.
File History of the related U.S. Appl. No. 11/227,829, for the period of Sep. 11, 2009-Jan. 19, 2010.
Japanese Office Action issued on the corresponding JP Application No. 2004-135167, dated Apr. 15, 2010.
File History of the related U.S. Appl. No. 11/128,489, for the period of Mar. 31, 2010-Jul. 28, 2010.
File History of the related U.S. Appl. No. 11/226,956, for the period of Mar. 31, 2010-Jul. 28, 2010.
File History of the related U.S. Appl. No. 11/227,829, for the period of Mar. 31, 2010-Jul. 28, 2010.
File History of the related U.S. Appl. No. 12/065,653, for the period of Sep. 11, 2009-Jul. 28, 2010.
Claims as pending on Jan. 18, 2011 in corresponding Japanese Patent Application No. 2004-135167.
Final Office Action issued by the Japanese Patent Office on Mar. 15, 2011 for the counterpart Japanese Patent Application No. 2004-135167.
Information Statement submitted in the corresponding Japanese Patent Application No. 2004-135167, dated Jan. 18, 2011.
"Electrical Properties of Polymers" by Yasuku Wada, published by Shokabo Publishing Co., Ltd, Aug. 15, 1987.
Notice of Preliminary Rejection mailed by Korean Intellectual Property Office on Aug. 26, 2011 in the corresponding Korean patent application No. 10-2005-0035503.
Examination Report issued by TIPO on Nov. 2, 2011 in the corresponding Taiwanese patent application No. 094112810.

* cited by examiner

PRESSURE-SENSITIVE ADHESIVE COMPOSITION AND PRESSURE-SENSITIVE ADHESIVE SHEETS

BACKGROUND OF THE INVENTION

1. Field of the invention

The present invention relates to an acryl-based pressure-sensitive adhesive composition. More particularly, the present invention relates to an antistatic pressure-sensitive adhesive composition, and pressure-sensitive adhesive sheets using the same. In particular, pressure-sensitive adhesive sheets of the present invention are useful as a surface protecting film (a protecting film) used for the purpose of protecting a surface of an optical member such as a polarizing plate, a wavelength plate, a phase difference plate, an optical compensating film, a reflecting sheet, and a luminance improving film which are used as a liquid crystal display or the like.

2. Description of the Related Art

A pressure-sensitive adhesive sheet can be adhered by applying a slight pressure at a normal temperature for a short time, and is used in various utilities for connecting various articles. In addition, since a pressure-sensitive adhesive sheet has a cohesive strength and elasticity, the sheet is suitably adhered and, conversely, can be peeled from a hard smooth surface, and is also utilized as a surface protecting film.

A surface protecting film is generally used for the purpose of preventing a scratch or a stain produced at procession or conveyance of a subject to be protected by applying to a subject to be protected via a pressure-sensitive adhesive layer coated on a protecting film side. For example, for the purpose of preventing a scratch or a stain, a surface protecting film is applied to an optical member such as a polarizing plate and a wavelength plate used in a panel of a liquid crystal display via a pressure-sensitive adhesive layer. In these optical films used for optical members, a separator is generally used for protecting the surface of a pressure-sensitive adhesive layer. In addition, in a step of applying a surface protecting film used for the purpose of protecting these optical members to optical members, since a separator become unnecessary, they are peeled and removed from an optical film.

In general, since a surface protecting film, a pressure-sensitive adhesive, and a separator which constitute a surface protecting film are constructed of a plastic material, they have high electric insulating property, and static electricity is generated upon friction or peeling. Therefore, there is a problem that, also upon peeling of a protecting film from an optical member such as a polarizing plate, static electricity is generated. Due to this static electricity, there arises a problem that a dust is attached to a surface protecting film or an optical member, and this pollutes an optical member. Then, in order to prevent such the disadvantage, a surface protecting film is subjected to various antistatic treatments.

Previously, as an attempt to suppress the aforementioned static electricity, for example, a method of preventing electrification by adding a low-molecular surfactant to a pressure-sensitive adhesive, and transferring a surfactant from a pressure-sensitive adhesive to an adherend has been disclosed (for example, see Patent Publication 1). However, the low-molecular surfactant is easily bled on a surface of a pressure-sensitive adhesive layer and, when applied to a surface protecting film, staining of an adherend (subject to be protected) is feared. Therefore, when a pressure-sensitive adhesive with a low-molecular surfactant added thereto is applied to a surface protecting film for an optical member, there is a problem that optical property of an optical member is deteriorated.

In addition, pressure-sensitive adhesive sheets in which an antistatic agent is contained in a pressure-sensitive adhesive layer (e.g. see Patent Reference 2) are disclosed. In such pressure-sensitive adhesive sheets, in order to suppress an antistatic agent from bleeding on a pressure-sensitive adhesive surface, an antistatic agent comprising a polyether polyol compound and an alkali metal salt is added to an acryl-based pressure-sensitive adhesive. However, even by using such pressure-sensitive adhesive sheets, phenomenon of bleeding of an antistatic agent is not avoided and, as a result, there is a problem that, in the case where actually applied to a surface protecting film, when treatment with time or under high temperature condition is performed, phenomenon is generated in which a surface protecting film is partially peeled off from a subject to be protected due to bleeding phenomenon.

As described above, in any of these, the aforementioned problems can not be solved well-balanced yet and, in the technical field associated with electronic appliances where electrification or staining becomes a particularly serious problem, it is difficult to correspond to demand of further improvement of an antistatic surface protecting film.

[Patent Publication 1] JP-A No. 9-165460

[Patent Publication 2] JP-A No. 6-128539

SUMMARY OF THE INVENTION

Then, in order to solve problems in the previous antistatic pressure-sensitive adhesive sheets, an object of the present invention is to provide an antistatic pressure-sensitive adhesive composition which is excellent in antistatic property of pressure-sensitive adhesive sheets upon peeling, and has reduced stainability in an adherend (subject to be protected) and is excellent in adhesion reliance, and electrification preventing pressure-sensitive adhesive sheets using the same.

SUMMARY OF THE INVENTION

In order to solve the aforementioned problems, the present inventors intensively studied and, as a result, found out that the aforementioned object can be attained by a pressure-sensitive adhesive composition shown below, which resulted in completion of the present invention.

That is, the pressure-sensitive adhesive composition of the present invention is characterized in that said composition contains a (meth)acryl-based polymer containing, as a monomer component, 15 to 100% by weight of a (meth)acrylic acid alkylene oxide adduct, 0 to 85% by weight of a (meth)acryl-based monomer containing an alkyl group of a carbon number of 1 to 14 other than the adduct, and 0 to 85% by weight of other polymerizable monomer, and an alkali metal salt.

The (meth)acryl-based polymer in the present invention refers to an acryl-based polymer and/or a methacryl-based polymer. And the (meth)acryl-based monomer in the present invention refers to an acryl-based monomer and/or a methacryl-based monomer. Also, the (meth)acrylate in the present invention refers to an acrylate and/or a methacrylate.

According to the pressure-sensitive adhesive composition of the present invention, as shown in results of Examples, since 15 to 100% by weight of a (meth)acrylic acid alkylene oxide adduct is a monomer component, and an alkali metal salt is further contained, in a pressure-sensitive adhesive layer obtained by crosslinking this, staining property on an adherend (subject to be protected) is reduced, and antistatic property of pressure-sensitive adhesive sheets upon peeling becomes excellent. Although details of reasons why a crosslinked base polymer using the aforementioned monomer component as a main component manifests such the property are not clear, it is presumed that, by coordination of an ether group in an acrylic acid alkylene oxide adduct with an alkali metal salt, bleeding of an alkali metal salt becomes difficult, and both of excellent antistatic property and low staining property are realized.

In the present invention, an acid value of the (meth)acryl-based polymer is preferably 29 or less, more preferably 20 or less, most preferably 15 or less. An acid value in the present invention means a mg number of potassium hydroxide necessary for neutralizing free fatty acid or resin acid contained in 1 g of a sample. It is presumed that, by existence of many carboxyl groups and sulfonate groups having great interaction with an alkali metal salt in a (meth)acryl-based polymer skeleton, ion conduction is prevented, and excellent antistatic ability of pressure-sensitive adhesive sheets is not obtained. In a (meth)acryl-based polymer having the acid value exceeding 29, excellent antistatic ability of pressure-sensitive adhesive sheets is not obtained in some cases.

The present invention is characterized in that an alkali metal salt is contained. By obtaining compatibility and well-balanced interaction with a (meth)acryl-based polymer using an alkali metal salt, electrification prevention upon peeling is realized, and a pressure-sensitive adhesive composition having reduced staining property on an adherent (subject to be protected) can be obtained.

Examples of an alkali metal salt which is used in the foregoing include a metal salt comprising lithium, sodium, or potassium and, among them, a lithium salt having high dissociating property is preferable.

On the other hand, a pressure-sensitive adhesive layer in the present invention is characterized in that it is formed by crosslinking the pressure-sensitive adhesive composition described above. According to the pressure-sensitive adhesive layer of the present invention, since a pressure-sensitive adhesive composition exerting the aforementioned action and effect is crosslinked to form the layer, staining property on an adherend (subject to be protected) is reduced, and a pressure-sensitive adhesive layer excellent in antistatic property of pressure-sensitive adhesive sheets upon peeling is obtained. For this reason, the layer becomes useful, particularly, as an antistatic type pressure-sensitive adhesive layer. In addition, by appropriately regulating a constituent unit and a constituent ratio of a (meth)acryl-based polymer, selection of a crosslinking agent, and an addition ratio, and crosslinking a pressure-sensitive adhesive composition, pressure-sensitive adhesive sheets more excellent in heat resistance can be obtained.

In addition, a pressure-sensitive adhesive sheet is characterized in that the film has a pressure-sensitive adhesive sheet, which is formed by crosslinking a pressure-sensitive adhesive composition as defined above on one side or both sides of a support. According to the pressure-sensitive adhesive sheet of the present invention, since the pressure-sensitive adhesive composition of the present invention exerting the aforementioned action and effect is used, electrification of a pressure-sensitive adhesive sheet can be prevented upon peeling, and a pressure-sensitive adhesive sheet which can reduce staining property on an adherend (subject to be protected) can be obtained. For this reason, in particular, those sheets are very useful as an antistatic surface protecting film in the technical field associated with an electron instrument in which electrification of static electricity and staining are a particularly serious problem.

BEST MODE FOR CARRYING OUT THE INVENTION

Figure 1:
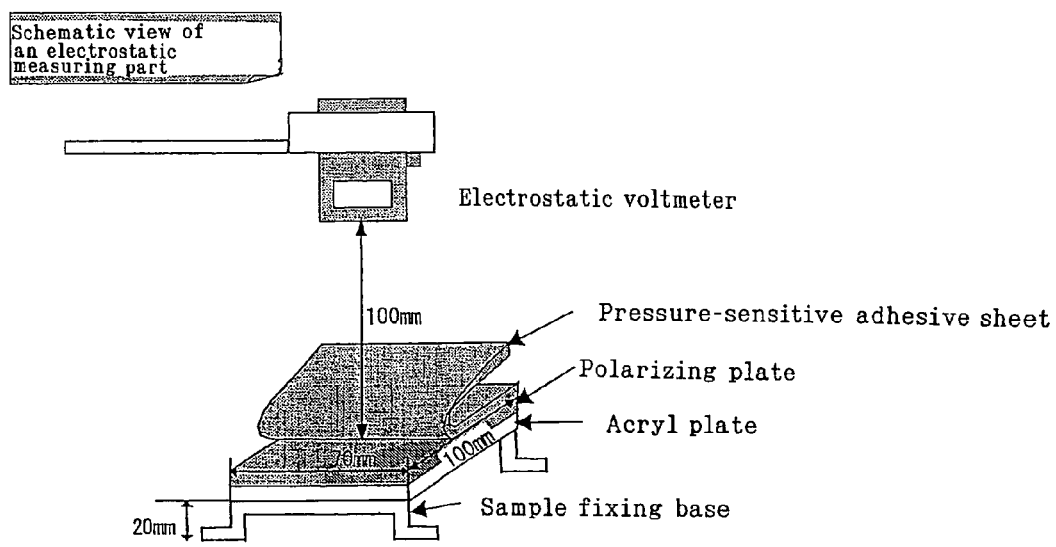
FIG. 1 is a schematic construction view of an electrostatic measuring part used for measuring a peeling electrification voltage in Examples.

Embodiments of the present invention will be explained in detail below.

That is, the pressure-sensitive adhesive composition of the present invention is characterized in that said composition contains a (meth)acryl-based polymer containing, as a monomer component, 15 to 100% by weight of a (meth)acrylic acid alkylene oxide adduct, 0 to 85% by weight of a (meth)acryl-based monomer containing an alkyl group of a carbon number of 1 to 14 other than the adduct, and 0 to 85% by weight of other polymerizable monomer, and an alkali metal salt.

A (meth)acryl-based polymer used in the present invention is not particularly limited as far as it is a (meth)acryl-based polymer having pressure-sensitive adhering property corresponding to the aforementioned property.

Examples of an oxyalkylene unit of a (meth)acrylic acid alkylene oxide adduct in the present invention include an alkylene group of a carbon number of 1 to 6 such as an oxymethylene group, an oxyethylene group, an oxypropylene group, and an oxybutylene group.

In addition, a mole number of addition of an oxyalkylene unit to (meth)acrylic acid is preferably 1 to 30, more preferably 1 to 20 from a viewpoint of affinity with an alkali metal salt. An end of an oxyalkylene chain may remain a hydroxyl group, or may be substituting with other functional group, and is preferably substituted with an alkyl group, a phenyl group or the like for appropriately controlling a crosslinking density.

Examples of a (meth)acrylic acid alkylene oxide adduct in the present invention include methoxy-polyethylene glycol (meth)acrylate type such as methoxy-diethylene glycol (meth)acrylate, and methoxy-triethylene glycol (meth)acrylate, ethoxy-polyethylene glycol (meth)acrylate type such as ethoxy-diethylene glycol (meth)acrylate, and ethoxy-triethylene glycol (meth)acrylate, butoxy-polyethylene glycol (meth)acrylate type such as butoxy-diethylene glycol (meth) acrylate, and butoxy-triethylene glycol (meth)acrylate, phenoxy-polyethylene glycol (meth)acrylate type such as phenoxy-diethylene glycol (meth)acrylate, and phenoxy-triethylene glycol (meth)acrylate, and methoxy-polypropylene glycol (meth)acrylate type such as methoxy-dipropylene glycol (meth)acrylate. Among them, ethoxy-diethylene glycol acrylate is preferably used.

(Meth)acrylic acid alkylene oxide adducts may be used alone, or two or more kinds may be used by mixing, and a content as a whole is preferably 15 to 100% by weight, more preferably 20 to 100% by weight, particularly preferably 25 to 100% by weight in a monomer component of a (meth) acryl-based polymer. When a content of a (meth)acrylic acid alkylene oxide adduct is less than 15% by weight, interaction with an alkali metal salt becomes insufficient, and effect of suppressing bleeding of an alkali metal salt and effect of reducing staining of an adherend (subject to be protected) are not sufficiently obtained, which is not preferable.

In addition, in the present invention, a (meth)acryl-based monomer having an alkyl group of a carbon number of 1 to 14 can be used, and it is more preferable to use a (meth)acryl-based monomer having an alkyl group of a carbon number of 2 to 13. Examples of (meth)acrylate having an alkyl group of a carbon number of 1 to 14 include methyl (meth)acrylate, ethyl (meth)acrylate, n-butyl (meth)acrylate, s-butyl (meth) acrylate, t-butyl (meth)acrylate, isobutyl (meth)acrylate, hexyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth)acrylate, n-tridecyl (meth)acrylate, and n-tetradecyl (meth)acrylate. Among them, n-butyl (meth)acrylate, and 2-ethylhexyl (meth)acrylate or the like are preferable to use for the present invention.

In the present invention, (meth)acryl-based monomers having an alkyl group of a carbon number of 1 to 14 may be used alone, or two or more kinds may be used by mixing, and a content as a whole is preferably 0 to 85% by weight, more preferably 0 to 80% by weight, particularly preferably 0 to 75% by weight in a monomer component of a (meth)acryl-based polymer. By using a (meth)acryl-based monomer having an alkyl group of a carbon number of 1 to 14, better interaction with an alkali metal salt, and better adherability can be appropriately regulated.

As other polymerizable monomer other than a (meth)acryl-based monomer having an alkyl group of a carbon number of 1 to 14, a polymerizable monomer for regulating a glass transition point or peelability of a (meth)acryl-based polymer can be used in such a range that the effect of the present invention is not deteriorated.

As other polymerizable monomer component used for polymerization of a (meth)acryl-based polymer, a cohesive strength or a heat resistance improving component such as a sulfonic acid group-containing monomer, a phosphoric acid group-containing monomer, a cyano group-containing monomer, vinyl esters, and an aromatic vinyl compound, and a component having a functional group working for improving an adhering force or for a crosslinking point, such as a carboxyl group-containing monomer, an acid anhydride group-containing monomer, a hydroxyl group-containing monomer, an amido group-containing monomer, an amino group-containing monomer, an imido group-containing monomer, an epoxy group-containing monomer, vinyl ethers can be appropriately used. Other components may be used alone, or two or more of them may be used by mixing.

When (meth)acrylate having an acid functional group such as a carboxyl group, a sulfonic acid group, and a phosphoric acid group is used, it is preferable to adjust an acid value of a (meth)acryl-based polymer 29 or less. When an acid value of a (meth)acryl-based polymer exceeds 29, there is a tendency that antistatic property is deteriorated.

An acid value can be adjusted by an amount of (meth) acrylate having an acid functional group to be blended, and examples thereof include a (meth)acryl-based polymer obtained by copolymerizing 2-ethylhexyl acrylate as a (meth) acryl-based polymer having a carboxyl group, and acrylic acid. In this case, by adjusting acrylic acid at 3.7 parts by weight relative to a total of 100 parts by weight of 2-ethylhexyl acrylate and acrylic acid, the aforementioned acid value can be satisfied.

Examples of the sulfonic acid group-containing monomer include styrenesulfonic acid, allylsulfonic acid, 2-(meth) acrylamido-2-methylpropanesulfonic acid, (meth)acrylamidopropanesulfonic acid, sulfopropyl (meth)acrylate, (meth) acryloyloxynaphthalenesulfonic acid, and sodium vinylsulfonate.

Examples of the phosphoric acid group-containing monomer include 2-hydroxyethylacryloyl phosphate.

Examples of the cyano group-containing monomer include acrylonitrile and methacrylonitrile.

Examples of vinylesters include vinyl acetate, vinyl propionate, and vinyl laurate.

Examples of the aromatic vinyl compound include styrene, chlorostyrene, chloromethylstyrene, α-methylstyrene, and other substituted styrene.

Examples of the carboxyl group-containing monomer include (meth)acrylic acid, carboxyethyl (meth)acrylate, carboxypentyl (meth)acrylate, itaconic acid, maleic acid, fumaric acid, crotonic acid, and isocrotonic acid.

Examples of the acid anhydride group-containing monomer include maleic acid anhydride, itaconic acid anhydride, and an acid anhydride of the aforementioned carboxyl group-containing monomer.

Examples of the hydroxyl group-containing monomer include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, (4-hydroxymethylcyclohexyl)methyl acrylate, N-methylol(meth)acrylamide, vinyl alcohol, allyl alcohol, 2-hydroxyethyl vinyl ether, 4-hydroxybutylvinyl ether, and diethylene glycol monovinyl ether.

Examples of the amido group-containing monomer include acrylamide, methacrylamide, diethylacrylamide, N-vinylpyrrolidone, N, N-dimethylacrylamide, N, N-dimethylmethacrylamide, N, N-diethylacrylamide, N, N-diethylmethacrylamide, N, N'-methylenebisacrylamide, N, N-dimethylaminopropylacrylamide, N, N-dimethylaminopropylmethacrylamide, and diacetoneacrylamide.

Examples of the amino group-containing monomer include aminoethyl (meth)acrylate, N, N-dimethylaminoethyl (meth)acrylate, N, N-dimethylaminopropyl (meth)acrylate, and (meth)acryloylmorpholine.

Examples of the imido group-containing monomer include cyclohexylmaleimide, isopropylmaleimide, N-cyclohexylmaleimide, and itaconeimide.

Examples of the epoxy group-containing monomer include glycidyl (meth)acrylate, methylglycidyl (meth)acrylate, and allyl glycidyl ether.

Examples of vinyl ethers include methyl vinyl ether, ethyl vinyl ether, and isobutyl vinyl ether.

The aforementioned other polymerizable monomer component may be used alone, or two or more kinds may be used by mixing, and a content as a whole is such that a polymerizable monomer component is preferably 0 to 85 parts by weight, more preferably 0 to 80 parts by weight, particularly preferably 0 to 75 parts by weight relative to 100 parts by weight of a total constituting unit of a (meth)acryl-based polymer. By using the aforementioned other polymerizable monomer component, better interaction with an alkali metal salt, and better adherability can be appropriately regulated.

A (meth)acryl-based polymer used in the present invention has a weight average molecular weight of preferably 100,000 to 5,000,000, more preferably 200,000 to 4,000,000, further preferably 300,000 to 3,000,000. When a weight average molecular weight is less than 100,000, there is a tendency that paste remaining is generated due to reduction in a cohesive strength of a pressure-sensitive adhesive composition. On the other hand, when a weight average molecular weight exceeds 5,000,000, there is a tendency that fluidity of a polymer is reduced, wetting on a polarizing plate becomes insufficient. A weight average molecular weight is obtained by measurement with GPC (gel permeation chromatography).

In addition, for the reason that pressure-sensitive adhering performance is easily balanced, it is desirable that a glass transition temperature (Tg) of the (meth)acryl-based polymer is 0° C. or lower (usually −100° C. or higher), preferably −10° C. or lower. When a glass transition temperature is higher than 0° C., it becomes difficult to obtain a sufficient adhering property. In addition, a glass transition temperature (Tg) of a (meth)acryl-based polymer can be adjusted in the aforementioned range by appropriating changing a monomer component and a composition ratio to be used.

The (meth)acryl-based polymer of the present invention is obtained by a polymerization method which is generally used as a procedure for synthesizing a (meth)acryl-based polymer such as solution polymerization, emulsion polymerization, bulk polymerization, and suspension polymerization. In addition, the resulting polymer may be any of a random copolymer, a block copolymer, and a graft copolymer.

Examples of an alkali metal salt used in the present invention include a metal salt comprising lithium, sodium, or potassium, and, specifically, a metal salt constructed of a cation consisting of $Li^+$, $Na^+$, or $K^+$, and an anion consisting of $Cl^-$, $Br^-$, $I^-$, $BF_4^-$, $PF_6^-$, $SCN^-$, $ClO_4^-$, $CF_3SO_3^-$, $(CF_3SO_2)_2N^-$, $(C_2F_5SO_2)_2N^-$, or $(CF_3SO_2)_3C^-$ is preferably used. Among them, a lithium salt such as LiBr, LiI, $LiBF_4$, $LiPF_6$, LiSCN, $LiClO_4$, $LiCF_3SO_3$, $Li(CF_3SO_2)_2N$, $Li(C_2F_5SO_2)_2N$, and $Li(CF_3SO_2)_3C$ is preferably used. These alkali metal salts may be used alone, or two or more kinds may be used by mixing.

Regarding a blending amount of an alkali metal salt used in the pressure-sensitive adhesive composition, an alkali metal salt is preferably blended at 0.01 to 5 parts by weight, more preferably 0.05 to 3 parts by weight relative to 100 parts by weight of a (meth)acryl-based polymer. When a blending amount is less than 0.01 parts by weight, sufficient electrification property is not obtained in some cases. On the other hand, when a blending amount is more than 5 parts by weight, there is a tendency that staining on an adherend (subject to be protected) is increased, which is not preferable.

In the pressure-sensitive adhesive composition of the present invention, pressure-sensitive adhesive sheets further excellent in heat resistance are obtained by appropriately crosslinking a base polymer, in particular, a (meth)acryl-based polymer. As a crosslinking agent used in the present invention, an isocyanate compound, an epoxy compound, a melamine-based resin, an aziridine derivative, and a metal chelate compound are used. Among them, mainly from a viewpoint of obtaining an appropriate cohesive strength, an isocyanate compound and an epoxy compound are particularly preferably used. These crosslinking agents may be used alone, or two or more kinds may be used by mixing.

Among them, examples of the isocyanate compound include aromatic isocyanate such as tolylene diisocyanate, and xylene diisocyanate, alicyclic isocyanate such as isophorone diisocyanate and aliphatic isocyanate such as hexamethylene diisocyanate.

More specific examples of the isocyanate compound include lower aliphatic polyisocyanates such as butylene diisocyanate, and hexamethylene diisocyanate, alicyclic isocyanates such as cyclopentylene diisocyanate, cyclohexylene diisocyanate, and isophorone diisocyanate, aromatic diisocyanates such as 2,4-tolylene diisocyanate, 4,4'-diphenylmethane diisocyanate, and xylene diisocyanate, and isocyanate adducts such as trimethylolpropane/tolylene diisocyanate trimer adduct (trade name: Coronate L manufactured by Nippon Polyurethane Industry Co., Ltd.), trimethylolpropane/hexamethylene diisocyanate trimer adduct (trade name: Coronate HL manufactured by Nippon Polyurethane Industry Co., Ltd.), and isocyanurate of hexamethylene diisocyanate (trade name: Coronate HX manufactured by Nippon Polyurethane Industry Co., Ltd.). These isocyanate compounds may be used alone, or may be used by mixing two or more kinds.

Examples of the epoxy compound include N,N,N',N'-tetraglycidyl-m-xylenediamine (trade name TETRAD-X manufactured by Mitsubishi Gas Chemical Company, Inc.) and 1,3-bis(N,N-diglycidylaminomethyl)cyclohexane (trade name TETRAD-C manufactured by Mitsubishi Gas Chemical Company Inc.). These compounds may be used alone, or may be used by mixing two or more kinds.

Examples of the melamine-based resin include hexamethylolmelamine.

Examples of the aziridine derivative include trade name HDU, trade name TAZM, and trade name TAZO (all manufactured by Sogo Pharmaceutical Co., Ltd.) as a commercially available product. These compounds may be used alone, or may be used by mixing two or more kinds.

Examples of the metal chelate compound include aluminum, iron, tin, titanium, nickel, and so on as metal components, and acetylene, methyl acetoacetic acid, ethyl lactic acid, and so on, as chelate components. These compounds may be used alone, or may be used by mixing two or more kinds.

An amount of these crosslinking agents to be used depends on balance between a (meth)acryl-based polymer to be crosslinked, and is appropriately selected depending on utility as a pressure-sensitive adhesive sheet. In order to obtain sufficient heat resistance due to a cohesive strength of an acryl pressure-sensitive adhesive, generally, the crosslinking agent is contained preferably at 0.01 to 15 parts by weight, more preferably 0.5 to 10 parts by weight relative to 100 parts by weight of the (meth)acryl-based polymer. When a content is less than 0.01 part by weight, crosslinking formation due to a crosslinking agent becomes insufficient, a cohesive strength of a pressure-sensitive adhesive composition becomes small, and sufficient heat resistance is not obtained in some cases, and there is a tendency that it becomes cause for an adhesive residue. On the other hand, when a content exceeds 15 parts by weight, a cohesive strength of a polymer is great, fluidtity is reduced, and wetting on an adherend (subject to be protected) becomes insufficient, and there is a tendency that this becomes cause for peeling off. These crosslinking agents may be used alone, or may be used by mixing two or more kinds.

Alternatively, a polyfunctional monomer containing two or more radiation-reactive unsaturated bonds as a substantial crosslinking agent is added, and this may be crosslinked with radiation.

As the polyfunctional monomer having two or more radiation-reactive unsaturated bonds, a polyfunctional monomer component having two or more of one kind or two or more kinds radiation-reactive groups which can be crosslinking-treated (cured) by irradiation of radiation, such as a vinyl group, an acryloyl group, a methacryloyl group, and a vinylbenzyl group is used. Generally, a component having 10 or less of radiation-reactive unsaturated bonds is suitably used. Two or more kinds of the polyfunctional monomer may be used by mixing.

Examples of the polyfunctional monomer include ethylene glycol di(meth)acrylate, diethlene glycol di(meth)acrylate, tetraethylene glycol di(meth)acrylate, neopentyl glycol di(meth)acrylate, 1,6-hexanediol di(meth)acrylate, trimethylolpropane tri(meth)acrylate, pentaerythritol tri(meth)acrylate, dipentaerythritol hexa(meth)acrylate, divinylbenzene, and N,N'-methylenebisacrylamide.

An amount of the polyfunctional monomer to be used depends on balance between a (meth)acryl-based polymer to be crosslinked, and is appropriately selected depending on utility as a pressure-sensitive adhesive sheet. In order to obtain sufficient heat resistance due to a cohesive strength of an acryl pressure-sensitive adhesive, generally, the monomer is preferably blended at 0.1 to 30 parts by weight relative to 100 parts by weight of a (meth)acryl-based polymer. From a viewpoint of flexibility and tackiness, the monomer is preferably blended at 10 parts by weight or less relative to 100 parts by weight of a (meth)acryl-based polymer.

Examples of radiation include ultraviolet ray, laser ray, α ray, β ray, γ ray, X-ray, and electron beam. From a viewpoint of controlling property and better handling property and a cost, ultraviolet ray is suitably used. More preferably, ultraviolet ray having a wavelength of 200 to 400 nm is used. Ultraviolet ray can be irradiated using an appropriate light source such as a high pressure mercury lamp, a micro-wave excitation-type lamp, and a chemical lamp. When ultraviolet ray is used as irradiation, a photopolymerization initiator is added to an acryl pressure-sensitive adhesive layer.

The photopolymerization initiator depends on a kind of a radiation-reactive component, and may be a substance which produces a radical or a cation by irradiating ultraviolet ray having an appropriately wavelength which can trigger the polymerization reaction.

Example of the photoradical polymerization initiator include benzoins such as benzoin, benzoin methyl ether, benzoin ethyl ether, methyl o-benzoylbenzoate-p-benzoin ethyl ether, benzoin isopropyl ether, and α-methylbenzoin, acetophenes such as benzyldimethylketal, trichloroacetophenone, 2,2-diethoxyacetophenone, and 1-hydroxycyclohexyl phenyl ketone, propiophenones such as 2-hydroxy-2-methylpropiophenone, and 2-hydroxy-4'-isopropyl-2-methylpropiophenone, benzophenones such as benzophenone, methylbenzophenone, p-chlorobenzophenone, and p-dimethylaminobenzophenone, thioxanthons such as 2-chlorothioxanthon, 2-ethylthioxanthon, and 2-isopropylthioxanthon, acylphosphine oxides such as bis(2,4,6-trimethylbenzoyl)-phenylphosphine oxide, 2,4,6-trimethylbenzoyl-diphenylphosphine oxide, and (2,4,6-trimethylbenzoyl)-(ethoxy)-phenylphosphine oxide, benzil, dibenzsuberone, and α-acyloxime ether.

Examples of a photocation polymerization initiator include onium salts such as an aromatic diazonium salt, an aromatic iodonium salt, and an aromatic sulfonium salt, organometallic complexes such as an ion-allene complex, a titanocene complex, and an aryl silanol-aluminum complex, nitrobenzyl ester, sulfonic acid derivative, phosphoric acid ester, phenolsulfonic acid ester, diazonaphthoquinone, and N-hydroxyimidosulfonate. Two or more kinds of the photopolymerization initiators may be used by mixing.

It is preferably that the photopolymerization initiator is blended usually in a range of 0.1 to 10 parts by weight, preferably 0.2 to 7 parts by weight relative to 100 parts by weight of a (meth)acryl-based polymer.

Further, it is also possible to use a photoinitiation polymerization assistant such as amines. Examples of the photoinitiation assistant include 2-dimethylaminoethyl benzoate, dimethylaminoacetophenone, p-dimethylaminobenzoic acid ethyl ester, and p-dimethylaminobenzoic acid isoamyl ester. Two or more kinds of the photopolymerization initiation assistants may be used. It is preferably that the polymerization initiation assistant is blended at 0.05 to 10 parts by weight, further 0.1 to 7 parts by weight relative to 100 parts by weight a (meth)acryl-based polymer.

Further, the previously known various additives such as a colorant, a powder as a pigment, a surfactant, an elasticizer, tackifiers, low molecular polymer, a surface lubricant agent, a leveling agent, an antioxidant, a corrosion preventing agent, a photo stabilizer, an ultraviolet absorbing agent, a polymerization inhibitor, a silane coupling agent, and a powder, a particle, and a foil of inorganic or organic filer, and metal powder may be appropriately added to the pressure-sensitive adhesive composition used in the pressure-sensitive adhesive sheet of the present invention depending on utility.

Meanwhile, the pressure-sensitive adhesive layer in the present invention is such that the aforementioned pressure-sensitive adhesive composition is crosslinked. In addition, pressure-sensitive adhesive sheets of the present invention is such that such the pressure-sensitive adhesive layer is formed on a supporting film (support). Thereupon, crosslinking of the pressure-sensitive adhesive composition is generally performed after coating of the pressure-sensitive adhesive composition, and a pressure-sensitive adhesive layer composition after crosslinking may be also transferred onto a supporting film (support).

When a photopolymerization initiator as an arbitrary component is added as described above, a pressure-sensitive adhesive layer can be obtained by coating the pressure-sensitive adhesive composition directly on a subject to be protected, or coating on one side or both sides of a supporting substrate (support), and performing light irradiation. Usually, a pressure-sensitive adhesive layer is used by photopolymerization by irradiating with ultraviolet ray having an irradiance of 1 to 200 mW/cm$^2$ at a wavelength of 300 to 400 nm, at an exposure dose of around 200 to 4000 mJ/cm$^2$.

A method of forming a pressure-sensitive adhesive layer on a film (support) is not particularly limited, but for example, a layer is prepared by coating the aforementioned pressure-sensitive adhesive composition on a supporting film, and drying this to remove a polymerization solvent to form a pressure-sensitive adhesive layer on a supporting film (support). Thereafter, aging may be performed for the purpose of adjusting transference of a component of a pressure-sensitive adhesive layer or adjusting a crosslinking reaction. Alternatively, when pressure-sensitive adhesive sheets are prepared by coating a pressure-sensitive adhesive composition on a supporting film, one or more kinds of solvents other than a polymerization solvent may be newly added to the composition so that the composition can be uniformly coated on a supporting film.

In addition, as a method of forming the pressure-sensitive adhesive layer of the present invention, the known method used for preparing pressure-sensitive adhesive sheets is used. Specifically, examples include roll coating, gravure coating, reverse coating, roll brushing, spray coating, and air knife coating methods, immersing and curtain coating method, and extruding coating method with a die coater.

Pressure-sensitive adhesive sheets of the present invention are such that the aforementioned pressure-sensitive adhesive layer is coated on one side or both sides of various supports comprising a plastic film such as a polyester film, or a porous material such as a paper and a non-woven fabric at a thickness of usually 3 to 100 μm, preferably around 5 to 50 μm, to form an aspect of a sheet or a tape.

A thickness of the support consisting of the surface protecting film which uses pressure-sensitive adhesive layer of the present is usually 5 to 200 μm, preferably around 10 to 100 μm. The support may be subjected to releasing, anti-staining with silicone, fluorine, long chain alkyl-based or fatty acid amide-based releasing agent, or a silica powder, easy adhesion treatment such as acid treatment, alkali treatment, primer treatment, corona treatment, plasma treatment, and ultraviolet ray treatment, or coating-type, kneading-type, or deposition-type antistatic treatment, if necessary.

In addition, it is preferable that the support is a plastic substrate having heat resistance and solvent resistance and, at the same time, having flexibility. By the support having flexibility, a pressure-sensitive adhesive composition can be coated with a roll coater or the like, and can be wound in a roll-like.

The plastic substrate is not particularly limited as far as it can be formed into a sheet or a film, and examples include a polyolefin film such as polyethylene, polypropylene, poly-1-butene, poly-4-methyl-1-pentene, a polybutadiene film, a polymethylpentene film, an ethylene-propylene copolymer, an ethylene-1-butene copolymer, an ethylene-vinyl acetate copolymer, an ethylene-ethyl acrylate copolymer, and an ethylene-vinyl alcohol copolymer, a polyester film such as polyethylene terephthalate, polyethylene naphthalate, and polybutylene terephthalate, a polyacrylate film, a polyurethane film, a polystyrene film, a polyamide film such as nylon 6, nylon, 6,6, and partially aromatic polyamide, a polyvinyl chloride film, a vinyl chloride copolymer film, a polyvinylidene chloride film, and a polycarbonate film.

In the pressure-sensitive adhesive sheets of the present invention, a separator (or peeling liner, peeling sheet etc.) can be applied on a pressure-sensitive adhesive surface for the purpose of protecting a pressure-sensitive adhesive surface, if necessary. As a substrate constituting a separator, there are a paper and a plastic film, and a plastic film is suitably used from a viewpoint of excellent surface smoothness. The film is not particularly limited as far as it is a film which can protect the pressure-sensitive adhesive layer, and examples include a polyolefin film such as polyethylene, polypropylene, poly-1-butene, and poly-4-methyl-1-pentene, a polybutadiene film, a polymethylpentene film, an ethylene-propylene copolymer, an ethylene-1-butene copolymer, an ethylene-vinyl acetate copolymer, an ethylene-ethyl acrylate copolymer, and an ethylene-vinyl alcohol copolymer, a polyester film such as polyethylene terephthalate, polyethylene naphthalate, and polybutylene terephthalate, a polyacrylate film, a polyurethane film, a polystyrene film, a polyamide film such as nylon 6, nylon 6,6, and partially aromatic polyamide, a polyvinyl chloride film, a vinyl chloride copolymer film, a polyvinylidene chloride film, and a polycarbonate film.

A thickness of the film is usually around 5 to 200 μm, preferably around 10 to 100 μm. A pressure-sensitive adhesive layer applying surface of the film can be appropriately subjected to treatment with a releasing agent such as a silicone-based, fluorine-based, long chain alkyl-based or fatty acid amide-based releasing agent, or a silica powder, or coating-type, kneading-type, or deposition-type antistatic treatment, if necessary.

A pressure-sensitive adhesive composition, a pressure-sensitive adhesive layer, and pressure-sensitive adhesive sheets using the present invention are used, particularly, in plastic products in which static electricity is easily generated. For this reason, they become very useful as an antistatic surface protecting film in the technical field associated with optical-electronic parts in which electrification or staining becomes a particularly serious problem.

EXAMPLES

Examples which specifically show a construction and effect of the present invention will be explained below. Assessment items in Examples were measured as follows:

Measurement of Molecular Weight of an (meth)acryl-Based Polymer

A molecular weight was measured using a GPC apparatus (HLC-8220GPC manufactured by Tosoh Corporation). Measuring conditions are as follows.

Sample concentration: 0.2 wt % (THF solution)
Sample injection amount: 10 μl
Eluent: THF
Flow rate: 0.6 ml/min
Measuring temperature: 40° C.
Column:
Sample column;
TSKguard column SuperHZ-H(1 column)+TSK gel Super HZM-H(2 columns)
Reference column;
TSK gel SuperH-RC(1 column)
Detector: Refractive index detector (RI)
A molecular weight was obtained in terms of polystyrene.

Measurement of Glass Transition Temperature Tg

A glass transition temperature Tg (° C.) was obtained by the following equation using the following reference values as a glass transition temperature $Tg_n$(° C.) of a homopolymer of each monomer.

Equation:

$$1/(Tg+273) = \Sigma[W_n/(Tg_n+273)]$$

[wherein Tg (° C.) represents a glass transition temperature of a copolymer, $W_n$ (–) represents a weight fraction of each monomer, $Tg_n$ (° C.) represents a glass transition temperature of a homopolymer of each monomer, and n represents a kind of each monomer]

Reference Values:
2-Ethylhexyl acrylate: −70° C.
2-Hydroxyethyl acrylate: −15° C.
Butyl acrylate: −55° C.
Ethoxy-diethilene glycol acrylate: −70° C.
Methoxy-dipropylene glycol acrylate: −40° C. (determined by a dynamic viscoelasticity measurement)
Acrylic acid: 106° C.

Measurement of a Dynamic Viscoelasticity

Sheets of an acryl-based polymer having a thickness of 25 μm were laminated into a thickness of about 2 mm, this was punched into φ7.9 mm to prepare a cylindrical pellet, and this was used as a sample for measuring a glass transition temperature (Tg). Using the measuring sample, the measuring sample was fixed on a jig of a φ7.9 mm parallel plate, temperature dependency of loss elastic modulus G" was measured with a dynamic viscoelasticity measuring apparatus (ARES manufactured by Rheometric Scientific, Inc.), and a temperature at which the resulting G" curve became a maximum was adopted as a glass transition temperature (Tg) (° C.). Measuring conditions are as follows.

Measurement: shear mode
Temperature range: −70° C. to 200° C.
Temperature raising rate: 5° C./min
Frequency: 1 Hz

Measurement of Acid Value

An acid value was measured using an automatically titrating apparatus (COM-550 manufactured by HIRANUMA SANGYO Co., Ltd.), and was obtained by the following equation.

$$A = \{(Y-X) \times f \times 5.611\}/M$$

A; Acid value
Y; Titration amount of sample solution (ml)
X; Titration amount of solution of only 50 g of mixed solvent (ml)
f; Factor of titration solution
M; Weight of polymer sample (g)

Measurement Conditions are as Follows:

Sample solution: About 0.5 g of a polymer sample was dissolved in 50 g of a mixed solvent (toluene/2-propanol/distilled water=50/49.5/0.5, weight ratio) to obtain a sample solution.

Titration solution: 0.1N 2-propanolic potassium hydroxide solution (for petroleum product neutralization value test manufactured by Wako Pure Chemical Industries, Ltd.)

Electrode: glass electrode; GE-101, comparative electrode; RE-201, Measurement mode: petroleum product neutralization value test 1

Examples will be explained below.

Example

Preparation of (meth)acryl-Based Copolymer

[Acryl-Based Copolymer (A)]

A four-neck flask equipped with a stirring wing, a thermometer, a nitrogen gas introducing tube, a condenser, and an addition funnel was charged with 140 parts by weight of 2-ethylhexyl acrylate, 60 parts by weight of ethoxy-diethylene glycol acrylate, 8 parts by weight of 2-hydroxyethyl acrylate, 0.4 parts by weight of 2,2'-azobisisobutyronitrile as a polymerization initiator, 94 parts by weight of toluene, and 218 parts by weight of ethyl acetate, a nitrogen gas was introduced while mildly stirring, a polymerization reaction was performed for about 6 hours while maintaining a liquid temperature in a flask at around 65° C., to prepare an acryl-based copolymer (A) solution (40% by weight). A weight average molecular weight of the acryl-based copolymer (A) was 500,000, a glass transition temperature (Tg) was −68° C., and an acid value was 0.

[Acryl-Based Copolymer (B)]

A four-neck flask equipped with a stirring wing, a thermometer, a nitrogen gas introducing tube, a condenser and an addition funnel was charged with 200 parts by weight of ethoxy-diethylene glycol acrylate, 12 parts by weight of 2-hydroxyethyl acrylate, 0.4 parts by weight of 2,2'-azobisisobutyronitrile as a polymerization initiator, 197 parts by weight of toluene, and 197 parts by weight of ethyl acetate, a nitrogen gas was introduced while mildly stirring, and a polymerization reaction was performed for about 6 hours while maintaining a liquid temperature in a flask at around 65° C., to prepare an acryl-based copolymer (B) solution (35% by weight). A weight average molecular weight of the acryl-based copolymer (B) was 430,000, a glass transition temperature (Tg) was −68° C., and an acid value was 0.

[Acryl-Based Copolymer (C)]

A four-neck flask equipped with a stirring wing, a thermometer, a nitrogen gas introducing tube, a condenser and an addition funnel was charged with 140 parts by weight of 2-ethylhexyl acrylate, 60 parts by weight of methoxy-dipropylene glycol acrylate, 8 parts by weight of 2-hydroxyethyl acrylate, 0.4 parts by weight of 2,2'-azobisisobutyronitrile as a polymerization initiator, 47 parts by weight of toluene, and 265 parts by weight of ethyl acetate, a nitrogen gas was introduced while mildly stirring, and a polymerization reaction was performed for about 6 hours while maintaining a liquid temperature in a flask at around 65° C., to prepare an acryl-based copolymer (C) solution (40% by weight). A weight average molecular weight of the acryl-based copolymer (C) was 490,000, a glass transition temperature (Tg) was −60° C., and an acid value was 0.

[Acryl-Based Copolymer (D)]

A four-neck flask equipped with a stirring wing, a thermometer, a nitrogen gas introducing tube, a condenser, and an addition funnel was charged with 140 parts by weight of 2-ethylhexyl acrylate, 60 parts by weight of ethoxy-diethylene glycol acrylate, 4 parts by weight of acrylic acid, 0.4 parts by weight of 2,2'-azobisisobutyronitrile as a polymerization initiator, 94 parts by weight of toluene, and 218 parts by weight of ethyl acetate, a nitrogen gas was introduced while mildly stirring, and a polymerization reaction was performed for about 6 hours while maintaining a liquid temperature in a flask at around 65° C., to prepare an acryl-based copolymer (D) solution (40% by weight). A weight average molecular weight of the acryl-based copolymer (D) was 500,000, a glass transition temperature (Tg) was −68° C., and an acid value was 15.

[Acryl-Based Copolymer (E)]

A four-neck flask equipped with a stirring wing, a thermometer, a nitrogen gas introducing tube, a condenser, and an addition funnel was charged with 140 parts by weight of butyl acrylate, 60 parts by weight of ethoxy-diethylene glycol acrylate, 8 parts by weight of 2-hydroxyethyl acrylate, 0.4 parts by weight of 2,2'-azobisisobutyronitrile as a polymerization initiator, 94 parts by weight of toluene, and 218 parts by weight of ethyl acetate, a nitrogen gas was introduced while mildly stirring, a polymerization reaction was performed for about 6 hours while maintaining a liquid temperature in a flask at around 65° C., to prepare an acryl-based copolymer (E) solution (40% by weight). A weight average molecular weight of the acryl-based copolymer (E) was 540,000, a glass transition temperature (Tg) was −58° C., and an acid value was 0.

[Acryl-Based Copolymer (F)]

A four-neck flask equipped with a stirring wing, a thermometer, a nitrogen gas introducing tube, a condenser, and an addition funnel was charged with 140 parts by weight of 2-ethylhexyl acrylate, 60 parts by weight of ethoxy-diethylene glycol acrylate, and 0.2 parts by weight of benzyldimethylketal (Irgacure 651 manufactured by Ciba Specialty Chemicals Co.) as a polymerization initiator, a nitrogen gas was introduced while mildly stirring, and a polymerization reaction was performed for about 3 minutes by ultraviolet-ray irradiation with a high pressure mercury lamp (SHL-100UVQ-2 manufactured by TOSHIBA LIGHTING & TECHNOLOGY CORPORATION) to prepare an acryl-based copolymer (F) solution (100% by weight) which is a partial polymer (syrup) having a polymerization rate of 10%. A weight average molecular weight of the acryl-based copolymer (F) was 2200,000, a glass transition temperature (Tg) was −70° C., and an acid value was 0.

[Acryl-Based Copolymer (G)]

A four-neck flask equipped with a stirring wing, a thermometer, a nitrogen gas introducing tube, a condenser, and an addition funnel was charged with 140 parts by weight of 2-ethylhexyl acrylate, 60 parts by weight of ethoxy-diethylene glycol acrylate, 8 parts by weight of acrylic acid, 0.4 parts by weight of 2,2'-azobisisobutyronitrile as a polymerization initiator, 94 parts by weight of toluene, and 218 parts by weight of ethyl acetate, a nitrogen gas was introduced while mildly stirring, and a polymerization reaction was performed for about 6 hours while maintaining a liquid temperature in a flask at around 65° C., to prepare an acryl-based copolymer (G) solution (40% by weight). A weight average molecular weight of the acryl-based copolymer (G) was 510,000, a glass transition temperature (Tg) was −66° C., and an acid value was 30.

[Acryl-Based Copolymer (H)]

A four-neck flask equipped with a stirring wing, a thermometer, a nitrogen gas introducing tube, a condenser, and an addition funnel was charged with 180 parts by weight of 2-ethylhexyl acrylate, 20 parts by weight of ethoxy-diethylene glycol acrylate, 8 parts by weight of 2-hydroxyethyl acrylate, 0.4 parts by weight of 2,2'-azobisisobutyronitrile as a polymerization initiator, 47 parts by weight of toluene, and 265 parts by weight of ethyl acetate, a nitrogen gas was introduced while mildly stirring, a polymerization reaction was performed for about 6 hours while maintaining a liquid temperature in a flask at around 65° C., to prepare an acryl-based copolymer (H) solution (40% by weight). A weight average molecular weight of the acryl-based copolymer (H) was 500,000, a glass transition temperature (Tg) was −68° C., and an acid value was 0.

[Acryl-Based Copolymer (I)]

A four-neck flask equipped with a stirring wing, a thermometer, a nitrogen gas introducing tube, a condenser, and an addition funnel was charged with 200 parts by weight of 2-ethylhexyl acrylate, 8 parts by weight of 2-hydroxyethyl acrylate, 0.4 parts by weight of 2,2'-azobisisobutyronitrile as a polymerization initiator, and 312 parts by weight of ethyl acetate, a nitrogen gas was introduced while mildly stirring, and a polymerization reaction was performed for about 6 hours while maintaining a liquid temperature in a flask at around 65° C., to prepare an acryl-based copolymer (I) solution (40% by weight). A weight average molecular weight of the acryl-based copolymer (I) was 540,000, a glass transition temperature (Tg) was −68° C., and an acid value was 0.

Preparation of Antistatic Agent Solution

[Antistatic Agent Solution (a)]

A four-neck flask equipped with a stirring wing, a thermometer, a condenser, and an addition funnel was charged with 5 parts by weight of lithium perchlorate, and 20 parts by weight of ethyl acetate, and mixing and stirring were performed for about 2 hours while maintaining a liquid temperature in a flask at around 25° C., to prepare an antistatic agent solution (a) (20% by weight).

[Antistatic Agent Solution (b)]

A four-neck flask equipped with a stirring wing, a thermometer, a condenser, and an addition funnel was charged with 5 parts by weight of lithium iodide, and 20 parts by weight of ethyl acetate, and mixing and stirring were performed for about 2 hours while maintaining a liquid temperature in a flask at around 25° C., to prepare an antistatic agent solution (b) (20% by weight).

[Antistatic Agent Solution (c)]

A four-neck flask equipped with a stirring wing, a thermometer, a condenser, and an addition funnel was charged with 0.5 parts by weight of lithium iodide, 9.5 parts by weight of polypropylene glycol (diol type, number average molecular weight 2000), and 10 parts by weight of ethyl acetate, and mixing and stirring were performed for about 2 hours while maintaining a liquid temperature in a flask at around 80° C., to prepare an antistatic agent solution (c) (50% by weight).

[Antistatic Agent Solution (d)]

A four-neck flask equipped with a stirring wing, a thermometer, a condenser, and an addition funnel was charged with 0.2 parts by weight of lithium perchlorate, 9.8 parts by weight of polypropylene glycol (diol type, number average molecular weight 2000), and 10 parts by weight of ethyl acetate, and mixing and stirring were performed for about 2 hours while maintaining a liquid temperature in a flask at around 80° C., to prepare an antistatic agent solution (d) (50% by weight).

Example 1

Preparation of Pressure-Sensitive Adhesive Solution

The acryl-based copolymer (A) solution (40% by weight) was diluted with ethyl acetate to 20% by weight, to 100 parts by weight of this solution were added 1.0 part by weight of the antistatic agent solution (a), 1.1 parts by weight of trimethylolpropane/tolylene diisocyanate trimer adduct (Coronate L, manufactured by Nippon Polyurethane Industry Co., Ltd., 75% by weight ethyl acetate solution) as a crosslinking agent, and 0.6 parts by weight of dibutyltin dilaurate (1% by weight ethyl acetate solution) as a crosslinking catalyst, and the materials were mixed and stirred to prepare an acryl-based pressure-sensitive adhesive solution (1).

Preparation of Pressure-Sensitive Adhesive Sheet

The acryl-based pressure-sensitive adhesive solution (1) was coated on one side of a polyethylene terephthalate film (thickness 38 μm) which had not been antistatic treated, and this was heated at 110° C. for 3 minutes to form a pressure-sensitive adhesive layer having a thickness of 20 μm. Then, a silicone-treated side of a polyethylene terephthalate film (thickness 25 μm) having one side which had been silicone-treated, was laminated on a surface of the pressure-sensitive adhesive layer to prepare a pressure-sensitive adhesive sheet.

Example 2

Preparation of Pressure-Sensitive Adhesive Solution

According to the same manner as that of Example 1 except that 0.7 parts by weight of the antistatic agent solution (b) was used in place of 1.0 part by weight of the antistatic agent solution (a), an acryl-based pressure-sensitive adhesive solution (2) was prepared.

Preparation of Pressure-Sensitive Adhesive Sheet

According to the same manner as that of Example 1 except that the acryl-based pressure-sensitive adhesive solution (2) was used in place of the acryl-based pressure-sensitive adhesive solution (1), a pressure-sensitive adhesive sheet was prepared.

Example 3

Preparation of Pressure-Sensitive Adhesive Solution

According to the same manner as that of Example 2 except that the acryl-based copolymer (B) solution was used in place of the acryl-based copolymer (A) solution, an acryl-based pressure-sensitive adhesive solution (3) was prepared.

Preparation of Pressure-Sensitive Adhesive Sheet

According to the same manner as that of Example 1 except that the acryl-based pressure-sensitive adhesive solution (3) was used in place of the acryl-based pressure-sensitive adhesive solution (1), a pressure-sensitive adhesive sheet was prepared.

Example 4

Preparation of Pressure-Sensitive Adhesive Solution

According to the same manner as that of Example 1 except that the acryl-based copolymer (C) solution was used in place of the acryl-based copolymer (A) solution, an acryl-based pressure-sensitive adhesive solution (4) was prepared.

Preparation of Pressure-Sensitive Adhesive Sheet

According to the same manner as that of Example 1 except that the acryl-based pressure-sensitive adhesive solution (4)

was used in place of the acryl-based pressure-sensitive adhesive solution (1), a pressure-sensitive adhesive sheet was prepared.

Example 5

Preparation of Pressure-Sensitive Adhesive Solution

The acryl-based copolymer (D) solution (40% by weight) was diluted with ethyl acetate to 20% by weight, to 100 parts by weight of this solution were added 1.0 part by weight of the antistatic agent solution (a), and 0.8 parts by weight of 1,3-bis(N, N-diglycidylaminomethyl)cyclohexane (TETRAD-C manufactured by Mitsubishi Gas Chemical Company, Inc.) as a crosslinking agent, and mixing and stirring were performed to prepare an acryl-based pressure-sensitive adhesive solution (5).

Preparation Pressure-Sensitive Adhesive Sheet

According to the same manner as that of Example 1 except that the acryl-based pressure-sensitive adhesive solution (5) was used in place of the acryl-based pressure-sensitive adhesive solution (1), a pressure-sensitive adhesive sheet was prepared.

Example 6

Preparation of Pressure-Sensitive Adhesive Solution

According to the same manner as that of Example 1 except that the acryl-based copolymer (E) solution was used in place of the acryl-based copolymer (A) solution, an acryl-based pressure-sensitive adhesive solution (6) was prepared.

Preparation of Pressure-Sensitive Adhesive Sheet

According to the same manner as that of Example 1 except that the acryl-based pressure-sensitive adhesive solution (6) was used in place of the acryl-based pressure-sensitive adhesive solution (1), a pressure-sensitive adhesive sheet was prepared.

Example 7

Preparation of Pressure-Sensitive Adhesive Solution

To 100 parts by weight of the acryl-based copolymer (F) solution (100% by weight) were added 0.2 parts by weight of lithium iodide, 1.0 part by weight of trimethylolpropane triacrylate as a polyfunctional monomer, and 0.1 parts by weight of benzyldimethylketal (Irgacure651 manufactured by Ciba Specialty Chemicals Co.) as a polymerization initiator, and mixing and stirring were performed for about 2 hours while maintaining at around 25° C. to prepare an acryl-based pressure-sensitive adhesive solution (7).

Preparation of Pressure-Sensitive Adhesive Sheet

The acryl-based pressure-sensitive adhesive solution (7) was coated on one side of a polyethylene terephthalate film (thickness 38 μm) which had not been antistatic treated, to form a pressure-sensitive adhesive layer having a thickness of 20 μm. Then, a silicone-treated side of a polyethylene terephthalate film (thickness 25 μm) which had been silicone-treated, was laminated with a surface of the pressure-sensitive adhesive layer. This film sheet was irradiated with ultraviolet-ray (an irradiance of 37 mW/cm$^2$, an exposure dose of 660 mJ/cm$^2$) by a high pressure mercury lamp (UVL-4000-N manufactured by Ushio Inc.) to prepare a pressure-sensitive adhesive sheet.

Example 8

Preparation of Pressure-Sensitive Adhesive Solution

According to the same manner as that of Example 5 except that the acryl-based copolymer (G) solution was used in place of the acryl-based copolymer (D) solution, an acryl-based pressure-sensitive adhesive solution (8) was prepared.

Preparation of Pressure-Sensitive Adhesive Sheet

According to the same manner as that of Example 1 except that the acryl-based pressure-sensitive adhesive solution (8) was used in place of the acryl-based pressure-sensitive adhesive solution (1), a pressure-sensitive adhesive sheet was prepared.

Comparative Example 1

Preparation of Pressure-Sensitive Adhesive Solution

According to the same manner as that of Example 1 except that the acryl-based copolymer (H) solution was used in place of the acryl-based copolymer (A) solution, an acryl-based pressure-sensitive adhesive solution (9) was prepared.

Preparation of Pressure-Sensitive Adhesive Sheet

According to the same manner as that of Example 1 except that the acryl-based pressure-sensitive adhesive solution (9) was used in place of the acryl-based pressure-sensitive adhesive solution (1), a pressure-sensitive adhesive sheet was prepared.

Comparative Example 2

Preparation of Pressure-Sensitive Adhesive Solution

According to the same manner as that of Example 1 except that the acryl-based copolymer (I) solution was used in place of the acryl-based copolymer (A) solution, and 4.0 parts by weight of the antistatic agent solution (c) was used in place of 1.0 part by weight of the antistatic agent solution (a), an acryl-based pressure-sensitive adhesive solution (10) was prepared.

Preparation of Pressure-Sensitive Adhesive Sheet

According to the same manner as that of Example 1 except that the acryl-based pressure-sensitive adhesive solution (10) was used in place of the acryl-based pressure-sensitive adhesive solution (1), a pressure-sensitive adhesive sheet was prepared.

Comparative Example 3

Preparation of Pressure-Sensitive Adhesive Solution

According to the same manner as that of Example 1 except that the acryl-based copolymer (I) solution was used in place of the acryl-based copolymer (A) solution, and 4.0 parts by weight of the antistatic agent solution (d) was used in place of 1.0 part by weight of the antistatic agent solution (a), an acryl-based pressure-sensitive adhesive solution (11) was prepared.

Preparation of Pressure-Sensitive Adhesive Sheet

According to the same manner as that of Example 1 except that the acryl-based pressure-sensitive adhesive solution (11) was used in place of the acryl-based pressure-sensitive adhesive solution (1), a pressure-sensitive adhesive sheet was prepared.

Comparative Example 4

Preparation of Pressure-Sensitive Adhesive Solution

According to the same manner as that of Example 1 except that the acryl-based copolymer (I) solution was used in place of the acryl-based copolymer (A) solution, and 2.0 parts by weight of a dialkyl sulfosuccinate ester sodium salt (NEO-COL P manufactured by Dai-Ichi Kogyo Seiyaku Co., Ltd.) which is an anionic surfactant was used in place of 1.0 part by weight of the antistatic agent solution (a), an acryl-based pressure-sensitive adhesive solution (12) was prepared.

Preparation of Pressure-Sensitive Adhesive Sheet

According to the same manner as that of Example 1 except that the acryl-based pressure-sensitive adhesive solution (12) was used in place of the acryl-based pressure-sensitive adhesive solution (1), a pressure-sensitive adhesive sheet was prepared.

Comparative Example 5

Preparation of Pressure-Sensitive Adhesive Solution

According to the same manner as that of Example 1 except that 1.0 part by weight of the antistatic agent solution (a) was not used, an acryl-based pressure-sensitive adhesive solution (13) was prepared.

Preparation of Pressure-Sensitive Adhesive Sheet

According to the same manner as that of Example 1 except that the acryl-based pressure-sensitive adhesive solution (13) was used in place of the acryl-based pressure-sensitive adhesive solution (1), a pressure-sensitive adhesive sheet was prepared.

Regarding pressure-sensitive adhesive sheets obtained in the aforementioned Examples and comparative Examples, a peeling electrification voltage, staining property, occurrence of peeling off, and an adhesive strength were assessed by the following conditions.

<Measurement of Peeling Electrification Voltage>

A pressure-sensitive adhesive sheet is cut into a size of a width of 70 mm and a length of 130 mm, a separator is peeled, and the sample is adhered to a surface of a polarizing plate (SEG1425EWVAGS2B manufactured by Nitto Denko Corporation, size; width 70 mm, length 100 mm) laminated to an acryl plate (Acrylite manufactured by Mitsubishi Rayon Co., Ltd, thickness: 1 mm, width: 70 mm, length: 100 mm) from which electricity has been removed in advance, with a hand roller, so that one end is protruded by 30 mm. After allowing to stand for one day under the environment of 23° C.×50% RH, a sample is set at a prescribed position as shown in FIG. 1 One end protruding by 30 mm is fixed on an automatic winding machine, and the sample is peeled at a peeling angle of 150° and a peeling rate of 10 m/min. After setting up the sample peeled off in a fixed stand, a voltage at a pressure-sensitive adhesive surface generated thereupon was measured with an electrostatic voltmeter (KSD-0103 manufactured by Kasuga Denki, INC.) fixed to height 100 mm away from sample. Measurement was performed under the environment of 23° C.×50% RH.

<Assessment of Stainability (Staining Property)>

A triacetylcellulose film (Fuji TAC manufactured by Fuji Photo Film Co., Ltd., thickness: 90 µm) was cut into a size of a width of 70 mm and a length of 100 mm, and this was immersed in an aqueous sodium hydroxide solution (10% by weight) at 60° C. for 1 minute, and washed with distilled water to prepare an adherend. The prepared pressure-sensitive adhesive sheet was cut into a size of a width of 50 mm and a length of 80 mm, a separator was peeled, and this was laminated on the adherend (using the adherend which had been washed with distilled water, and allowed to stand for one day under environment of 23° C.×50% RH) at a pressure of 0.25 MPa to prepare an assessment sample.

This assessment sample was allowed to stand for 1 day under the environment 23° C.×50% RH and, thereafter, the pressure-sensitive adhesive sheet was peeled from an adherend with a hand, and staining state of an adherend surface thereupon was observed with naked eyes. Assessment criteria are as follows:

Case of observation of no staining: ○
Case of observation of staining: x

<Assessment of Occurrence of Peeling Off>

A sample in which a pressure-sensitive adhesive sheet had been laminated on a polarizing plate (SEG1425EWVAGS2B manufactured by Nitto Denko Corporation) at a pressure of 0.25 MPa, was cut into a size of a width of 30 mm and a length of 30 mm, a separator laminated to a polarizing plate side was peeled, and was contact-bonded on a slide glass (Suienma manufactured by Matsunami Glass Industry Ltd., thickness: 1.3 mm, width: 65 mm, length: 165 mm) with a hand roller to obtain an assessment sample. The assessment sample was allowed to stand for one day under environment of 23° C.×50% RH, and subjected to autoclave treatment for 40 minutes under environment of 50° C.×5 atm. Thereafter, after allowed to stand for 2 hours under environment of 80° C., whether a pressure-sensitive adhesive sheet is peeled off from a polarizing plate or not was confirmed with naked eyes. Assessment criteria are as follows:

Case where occurrence of peeling off was not recognized: ○
Case where occurrence of peeling off was recognized: x <Measurement of Adhesive Strength>

A triacetylcellulose film (FujiTAC manufactured by Fuji Photo Film Co., Ltd., thickness: 90 µm) was cut into a width of 70 mm and a length of 100 mm, and this was immersed in an aqueous sodium hydroxide solution (10% by weight) at 60° C. for 1 minute, and washed with distilled water to prepare an adherend. The adherend was allowed to stand for 1 day under the environment of 23° C.×50% RH, to obtain an adherend for assessing an adhesive strength. A pressure-sensitive adhesive sheet which had been cut into a size of a width of 20 mm and a length of 100 mm was laminated on the aforementioned adherend for assessment at a pressure of 0.25 MPa to prepare an assessment sample. After allowed to stand for 30 minutes after lamination, an adhesive strength when peeled at a peeling rate of 10 m/min and a peeling angle of 180° using a tensile tester machine was measured. Measurement was performed under the environment of 23° C.×50% RH.

The above results are shown in Table 1.

TABLE 1

| | Peeling electrification voltage [kV] | Staining property [−] | Occurrence of floating [−] | Adhesive strength [N/20 mm] |
|---|---|---|---|---|
| Example 1 | +0.1 | ○ | ○ | 1.3 |
| Example 2 | +0.1 | ○ | ○ | 1.5 |
| Example 3 | 0.0 | ○ | ○ | 0.7 |
| Example 4 | +0.1 | ○ | ○ | 2.3 |
| Example 5 | 0.0 | ○ | ○ | 1.0 |
| Example 6 | 0.0 | ○ | ○ | 2.1 |
| Example 7 | 0.0 | ○ | ○ | 1.2 |
| Example 8 | +0.4 | ○ | ○ | 0.9 |
| Comparative Example 1 | 0.0 | x | ○ | 1.4 |
| Comparative Example 2 | 0.0 | x | x | 1.8 |
| Comparative Example 3 | 0.0 | x | x | 1.7 |
| Comparative Example 4 | +0.1 | x | x | 0.4 |
| Comparative Example 5 | +0.9 | ○ | ○ | 1.2 |

From the results of Table 1, it is seen that, when a pressure-sensitive adhesive composition containing an acryl-based copolymer having a (meth)acrylic acid alkylene oxide adduct prepared in accordance with the present invention was used (Examples 1 to 8), adhesion reliance is excellent and, at the same time, a peeling electrification voltage is suppressed to a low value, and staining on a polarizing plate and occurrence of peeling off are not present in any of Examples.

To the contrary, in any of the case where only 10% by weight of a (meth)acrylic acid alkylene oxide adduct is contained in a constitutional unit of a (meth)acryl-based (co) polymer (Comparative Example 1), where a (meth)acrylic acid alkylene oxide adduct is not contained (Comparative Examples 2 and 3), and where an anionic surfactant is contained as an antistatic agent (Comparative Example 4), occurrence of staining on a polarizing plate was perceived although a peeling electrification voltage was suppressed low. In addition, in the case where a (meth)acrylic acid alkylene oxide adduct is contained, but an alkali metal salt is not contained (Comparative Example 5), such the results were obtained that a peeling electrification voltage was as high as 0.5 kV or higher although staining on a polarizing plate was not perceived. Further, in any of Comparative Examples 2 to 4, occurrence of peeling off was perceived. Therefore, in any of Comparative Examples, such the results were obtained that suppression of a peeling electrification voltage, and suppression of staining on a polarizing plate and occurrence of peeling off can not be realized at the same time, and it was made clear that it is not suitable in a pressure-sensitive adhesive composition for an antistatic pressure-sensitive adhesive sheet.

Therefore, it was confirmed that the pressure-sensitive adhesive composition of the present invention is a pressure-sensitive adhesive composition which is excellent in electrification preventing property upon peeling, stainability on an adherend (subject to be protected) is reduced, and has high adhesion reliance.

What is claimed is:

1. A pressure-sensitive adhesive composition, which comprises a (meth)acryl-based polymer containing, as a monomer component, 25 to 100% by weight of a (meth)acrylic acid alkylene oxide adduct, 0 to 75% by weight of a (meth)acryl-based monomer having an alkyl group of a carbon number of 1 to 14 other than the adduct, and 0 to 75% by weight of other polymerizable monomer, and an alkali metal salt, and further comprising 0.5-15 parts by weight of a crosslinking agent relative to 100 parts by weight of the (meth)acryl-based polymer, wherein the crosslinking agent is selected from the group consisting of an isocyanate compound, an epoxy compound, a melamine-based resin, a metal chelate compound, and a combination thereof, wherein the pressure-sensitive adhesive composition contains 0.01 to 0.7 parts by weight alkali metal salt per 100 parts by weight (meth)acryl-based polymer; and wherein the mole number of addition of the oxyalkylene unit to (meth)acrylic acid present in the (meth)acrylic acid alkylene oxide adduct is 1 to 30, and wherein an acid value of the (meth)acryl-based polymer is 29 or less.

2. The pressure-sensitive adhesive composition according to claim 1, wherein the alkali metal salt is a lithium salt.

3. A pressure-sensitive adhesive layer, which is formed by crosslinking a pressure-sensitive adhesive composition as defined in claim 1.

4. A pressure-sensitive adhesive sheet comprising a pressure-sensitive adhesive layer, which is formed by crosslinking a pressure-sensitive adhesive composition as defined in claim 1 on one side or both sides of a support.

5. A pressure-sensitive adhesive layer, which is formed by crosslinking a pressure-sensitive adhesive composition as defined in claim 2.

6. A pressure-sensitive adhesive sheet comprising a pressure-sensitive adhesive layer, which is formed by crosslinking a pressure-sensitive adhesive composition as defined in claim 2 on one side or both sides of a support.

7. The pressure-sensitive adhesive composition according to claim 1, wherein the composition comprises 0.5 to about 5.5 parts by weight of the crosslinking agent.

8. The pressure-sensitive adhesive composition according to claim 1, wherein the composition does not include an aziridine derivative.

9. The pressure-sensitive adhesive composition according to claim 1, wherein the (meth)acryl-based polymer is obtained by mixing the monomer components in a polymerization solvent and polymerizing the monomer components.

10. A pressure-sensitive adhesive layer having antistatic property and low staining property comprising a crosslinked product of a pressure-sensitive adhesive composition comprising: a (meth)acryl polymer of monomer components constituted by (i) 25 to 100% by weight of a (meth)acrylic acid alkylene oxide adduct, (ii) 0 to 75% by weight of a (meth) acryl monomer having an alkyl group of a carbon number of 1 to 14 other than the adduct, and (iii) 0 to 75% by weight of other monomers, and an alkali metal salt, and further comprising 0.5-15 parts by weight of a crosslinking agent relative to 100 parts by weight of the (meth)acryl-based polymer, wherein the crosslinking agent is selected from the group consisting of an isocyanate compound, an epoxy compound, a melamine-based resin, a metal chelate compound, and a combination thereof, wherein the pressure-sensitive adhesive composition contains 0.01 to 0.7 parts by weight alkali metal salt per 100 parts by weight (meth)acryl polymer; and wherein the alkali metal salt is coordinated at an ether group of the acrylic acid alkylene oxide adduct, and wherein an acid value of the (meth)acryl-based polymer is 29 or less.

11. The pressure-sensitive adhesive layer according to claim 10, wherein the alkali metal salt is selected from the group consisting of LiBr, LiI, LiBF$_4$, LiPF$_6$, LiSCN, LiClO$_4$, LiCF$_3$SO$_3$, Li(CF$_3$SO$_2$)$_2$N, Li(C$_2$F$_5$SO$_2$)$_2$N, and Li(CF$_3$SO$_2$)$_3$C.

12. The pressure-sensitive adhesive layer according to claim 10, wherein the (meth)acryl polymer has a weight average molecular weight of preferably 100,000 to 5,000,000.

13. The pressure-sensitive adhesive layer according to claim 10, wherein the (meth)acrylic acid alkylene oxide adduct has an oxyalkylene unit including an alkylene group of a carbon number of 1 to 6.

14. The pressure-sensitive adhesive layer according to claim 13, wherein the alkylene group of a carbon number of 1 to 6 is selected from the group consisting of an oxymethylene group, an oxyethylene group, an oxypropylene group, and an oxybutylene group.

15. The pressure-sensitive adhesive layer according to claim 13, wherein the oxyalkylene unit has an oxyalkylene chain, an end of which is substituted with an alkyl group or a phenyl group.

* * * * *

UNITED STATES PATENT AND TRADEMARK OFFICE
CERTIFICATE OF CORRECTION

| | | |
|---|---|---|
| PATENT NO. | : 8,153,251 B2 | |
| APPLICATION NO. | : 11/117114 | |
| DATED | : April 10, 2012 | |
| INVENTOR(S) | : Natsuki Kobayashi et al. | |

It is certified that error appears in the above-identified patent and that said Letters Patent is hereby corrected as shown below:

At Title Page 2, Item [56], Column 2, Line 50, under other publications, please change "Yasuku" to --Yasaku--.

At Column 6, Line 37, please change "itaconeimide." to --itaconimide.--.

At Column 8, Line 38, please change "fluidtity" to --fluidity--.

At Column 8, Line 58, please change "diethlene" to --diethylene--.

At Column 9, Line 27, please change "acetophenes" to --acetophenones--.

At Column 9, Line 38, please change "dibenzsuberone," to --dibenzosuberone,--.

At Column 12, Line 31, please change "diethilene" to --diethylene--.

At Column 13, Line 1, please change "Follows:" to --follows:--.

At Column 17, Line 19, please change "Preparation" to --Preparation of--.

At Column 17, Line 52, please change "(Irgacure651" to --(Irgacure 651--.

Signed and Sealed this
Second Day of October, 2012

David J. Kappos
*Director of the United States Patent and Trademark Office*